United States Patent [19]

Van Meter

[11] 4,225,159

[45] * Sep. 30, 1980

[54] FITTING FOR SMOOTH WALL TUBES

[75] Inventor: Homer Van Meter, Sun City Center, Fla.

[73] Assignee: Ramer Test Tools, Inc., Stevensville, Mich.

[*] Notice: The portion of the term of this patent subsequent to May 15, 1996, has been disclaimed.

[21] Appl. No.: 22,964

[22] Filed: Mar. 23, 1979

Related U.S. Application Data

[63] Continuation-in-part of Ser. No. 901,609, May 1, 1978, Pat. No. 4,154,465, which is a continuation-in-part of Ser. No. 816,157, Jul. 15, 1977, abandoned.

[51] Int. Cl.² ............................................. F16L 37/18
[52] U.S. Cl. .................................. 285/104; 285/312; 285/323; 285/338
[58] Field of Search ............... 285/312, 338, 346, 323, 285/196, 104, 105

[56] References Cited

U.S. PATENT DOCUMENTS

| | | | |
|---|---|---|---|
| 3,058,760 | 10/1962 | Bankowski | 285/196 |
| 3,542,076 | 11/1970 | Richardson | 285/338 X |
| 3,868,132 | 2/1975 | Racine | 285/323 X |
| 4,154,465 | 5/1979 | Van Meter | 285/312 |

*Primary Examiner*—Thomas F. Callaghan
*Attorney, Agent, or Firm*—Jakala, Knechtel, Valentino, Demeur & Dallas

[57] ABSTRACT

This invention relates to a fitting for mounting to the ends of smooth wall tubes, particularly smooth wall tubes having a bead on the ends thereof. The fitting both grips and seals the inside diameter of the tube, with positive adjustable handle torque action.

8 Claims, 2 Drawing Figures

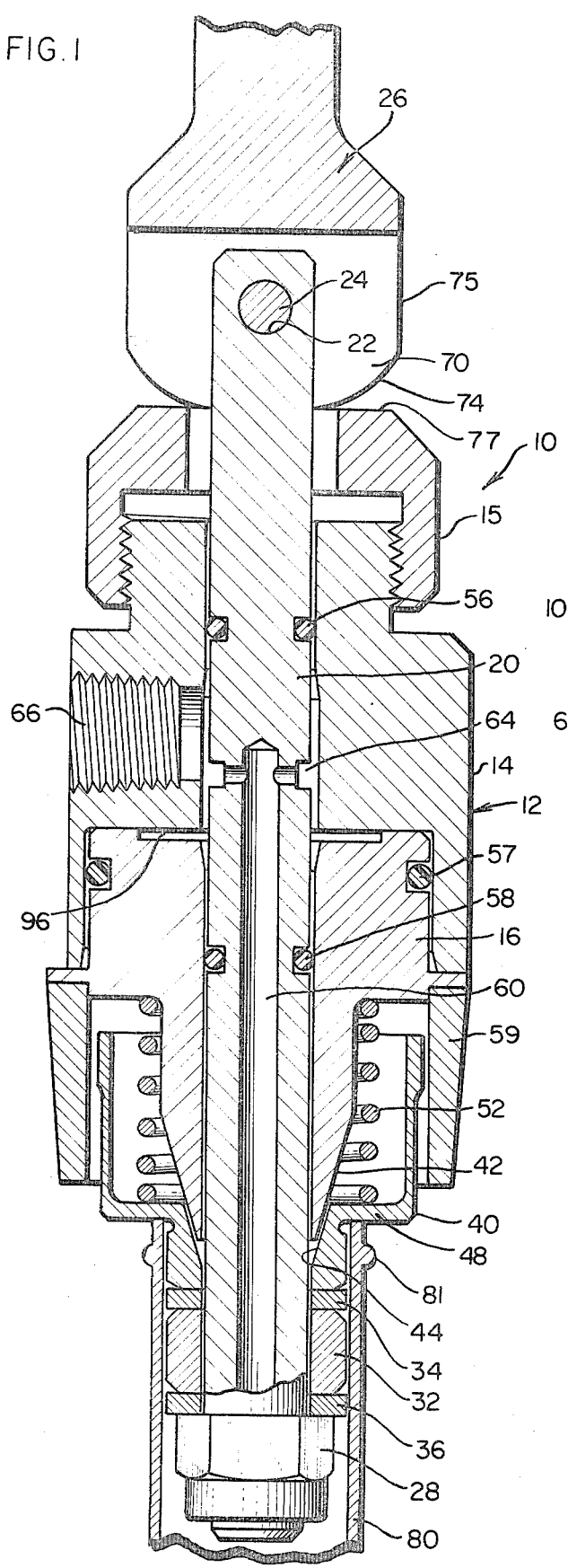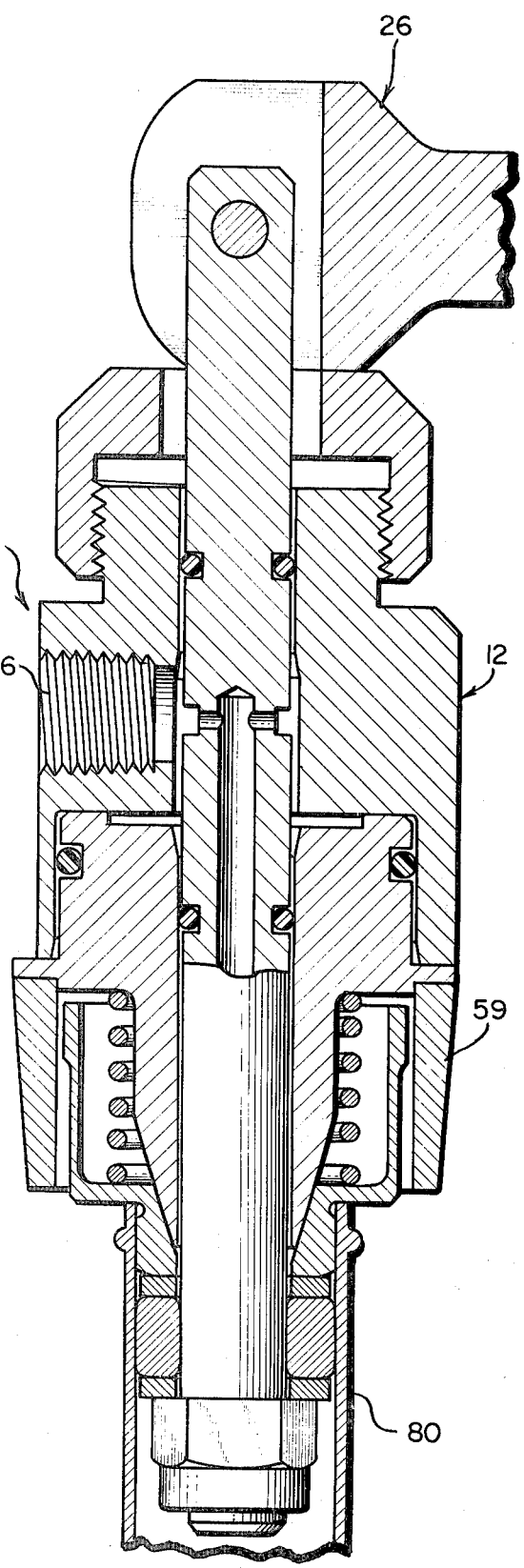

FITTING FOR SMOOTH WALL TUBES

This application is a continuation-in-part of copending application, Ser. No. 901,609, filed May 1, 1978, now U.S. Pat. No. 4,154,465, which is, in turn, a continuation-in-part of Ser. No. 816,157, filed July 15, 1977 and now abandoned.

BACKGROUND AND BRIEF DESCRIPTION OF THE PRESENT INVENTION

This invention relates to a fitting for mounting to the ends of smooth wall tubes, particularly tubes of copper or aluminum having on the end thereof a bead or a flange fitting brazed thereto.

The fitting of the present invention is generally related to those types of fittings disclosed in the U.S. Pat. Nos. 3,738,688; 3,779,587; and 3,868,132.

The fittings disclosed in the above-mentioned United States patents are mounted to the end of a smooth wall tube by, generally, compressing a tubular plug against the outer diameter of the tube upon translation of a ram element within the housing thereof. Such fittings provide a good seal and holding action so that fluids passing through the smooth wall tube may be sealed by the fitting, or may be conveyed out of the fitting into auxiliary tubing mounted thereto.

The fittings disclosed in the above-mentioned copending application Ser. No. 901,609, are particularly designed for application on short protrusion or expanded refrigeration and air conditioning tube ends existing on all industrial components, such as, for example, condensers, evaporators, compressors, header assemblies and the like. In many cases, the tubing is thin-walled, and fittings of the type disclosed in the above-identified United States patents can distort the tube ends when fitted thereto.

Accordingly, this copending application provides a fitting that not only grips on the outside diameter, but also seals on the inside diameter. The counter forces of ID sealing and OD gripping at the same point eliminate the possibility of tube distortion especially on minimum wall tubing even at elevated pressures.

In many applications where a rubber tube or hose is to be attached to a connection such as the end of a smooth wall tube, the tube has a bead provided on its end, or a flange fitting is brazed to its end. The rubber tube or hose is slipped over the bead onto the tube, or onto the flange fitting, and then is secured thereon with a clamp. The bead in combinaton with the clamp provides greater securement on the rubber tube or hose with the connection. The fitting of the present invention is particularly applicable for use with smooth wall tubes of this type, to both grip and seal the tube on its inside diameter.

Accordingly, it is an object of the present invention to provide an improved fitting for mounting to the ends of smooth wall tubes. More particularly, it is an object to provide such a fitting which is designed for application on tubes having beads or flange fittings on the ends thereof, to grip and to seal the inside diameter of the tube.

BRIEF DESCRIPTION OF THE DRAWINGS

For a fuller understanding of the nature and objects of the invention, reference should be had to the following detailed description taken in connection with the accompanying drawings, in which:

FIG. 1 is a sectional view taken longitudinally through a fitting exemplary of the invention, in its inoperative position; and FIG. 2 is a similar view of the fitting, in its operated position.

DESCRIPTION OF A PREFERRED EMBODIMENT

Referring now to the drawing, in FIGS. 1 and 2, a tube fitting 10 is illustrated which comprises a generally elongated housing 12 including a body 14 to which is threadedly affixed at its upper end an adjusting nut 15. Within the other or lower end of the body 14 is a collect operator 16 which is secured therein, as more fully described below. A shaft 20 extends longitudinally through the adjusting nut 15, the body 14, and the collect operator 16. The upper end of the shaft 20 is flattened and has an aperture 22 provided in it, for receiving a fastening pin or rivet 24, for securing the shaft 20 to a handle 26.

The lower terminal end of the shaft 20 has a resilient sealing member 32 disposed about it, and the sealing member 32 is sandwiched between a pair of seal stops 34 and 36. The sealing member 32 and the seal stops 34, 36 are retained thereon by means of a nut 28 threadedly affixed to the end of shaft 20. The seal stops 34 and 36 are of a washer-type construction. The resilient sealing member 32 may be made of rubber or other like material, and is generally of a cylindrical configuration.

A split collet 40 is disposed about and is slidably engageable with the lower end of the collet operator 16. The collet operator 16 and the collet 40 have complimentary conical-shaped cam surfaces 42 and 44 on them, respectively, for operating the collet 40 to grip a tube end, as more fully described below. The upper portion of the collet 40 is generally cup-shaped, and its bottom wall 48 forms an annular shoulder or tube stop.

A helical spring 52 is disposed about the lower portion of the collet operator 16 and is disposed within the collet 40. One end of the spring 52 bears against the collet operator 16 and its other end bears against the bottom wall 48 of the collet 40. The spring 52 normally urges the collet 40 out of engagement with the collet operator 16. The collet operator 16 and the collet 40 both are restrained by the seal stop 34. Correspondingly, the collet operator 16 is retained within the body 14 about the shaft 20 in operative relationship with the collet 40, by the collet 40. A cylindrical skirt 59 is secured to the collet operator 16 and depends downwardly about the collet 40 to prevent anyone's fingers from being pinched during operation of the fitting.

"O" ring seals 56 and 58 are disposed within seal seats formed in the side wall of the shaft 20, and provide seals between the shaft 20, the body 14 and the collet operator 16. An "O" ring seal 57 also is disposed within a seal seat formed in the side wall of the collet operator 16, and provides a seal between the latter and the depending skirt portion 59 of the body 14.

A fluid channel 60 is provided through the shaft 20, and this fluid channel 60 is in communication with a fluid channel 64 which is, in turn, in communication with an outlet port 66 in the body 14. The outlet port 66 permits fluids to be conveyed into or out of the fitting 10 via auxiliary tubing mounted thereto. The outlet port 66 can be plugged, and the fitting 10 merely used as a stop, without loss of the safety feature hereinafter described.

The handle 26 has an enlarged head portion 70 which has a slot formed in it for receiving therein the flattened portion of the shaft 20 and aligned apertures for receiving therethrough the pin or rivet 24 for securing together the handle 26 and the shaft 20. The outer peripheral edge or edges 74 of the head portion 70 are engageable with the upper surface or end 77 of the adjusting nut 15 and form cam surfaces for operating the fitting 10, as more fully described below.

In using the fitting 10, the end of a smooth wall tube, in this case, the tube 80 having thereon a bead 81, is fitted about the end of the shaft 20, with the seal stops 34 and 36 and the seal 32 disposed within the tube 80. The end of the tube 80 is urged onto or about the end of the shaft 20, until the end of the tube 80 engages and is stopped by the bottom wall 48 of the collet 40 which forms a tube stop. When positioned, the bead 81 preferably is disposed and is substantially aligned with the functional end of the collet 40 which grips the tube 80, and above the sealing member 32.

The handle 26 initially is disposed to extend upwardly in longitudinal alignment with the longitudinal axis of the fitting 10. The fitting 10 is affixed to a tube by operting the handle 26 by pivotally rotating it 90 degrees, in either a clockwise or counter-clockwise fashion to a position as illustrated in FIG. 2, to engage its cam surfaces 74 with upper surface or end 77 of the adjusting nut 15. This camming action pulls the shaft 20 upwardly and/or simulateously pushes the body 12 downwardly, as illustrated in FIG. 2. This action and reaction initially pushes the collet operator 16 downwardly, and engages its cam surface 42 with the cam surface 44 on the collet 40. In addition, the nut 28, on the shaft 20 engages the seal stop 36 and, as the shaft 20 is pulled upwardly, the tube stop 34 engages the end of the collet 40. The cam surface 44 on the collet 40 by the action of the shaft 20 being pulled upwardly and the tube stop 34 engaging the end of the collet 40 and urging it upwardly, is forcibly engaged with the cam surface 42 on the collet operator 16. As a result, the collet 40 expands and grips the interior diameter of the tube 80. Simultaneously, the resilient seal 32 is compressed between the seal stops 34 and 36, and seals the inside diameter of the tube 80. When the bead 81 is disposed in alignment with the operative or gripping portion of the collet 40, it tends to prevent any distortion of the tube end, when the fitting is affixed to it.

The flats 75 on the enlarged head portion 70 of the handle 26 provide a stop, so that when the handle 26 is operated to these stop positions, it need not be held. The degree of sealing and gripping can be controlled by adjustment of the adjusting nut 15.

The handle 26 is operated in a counter-clockwise direction to its initial position to release the fitting 10. In doing so, the shaft 20 and the seal screw 28 are pushed downwardly, to disengage the seal 32. The spring 52 bears upon the annular stop 50 in the collet 40, and urges it out of the collet operator 16, to thereby release the grip on the outside diameter of the tube.

A fluid pressure also can be used to provide or assist in providing a more positive or secure engagement of the fitting to the tube 80. This fluid pressure is externally applied to the fitting 10, via the port 66. This fluid pressure not only flows into and through the fluid channel 60 in the shaft 20 but it also flows about the shaft 20, between the body 14 and the collet operator 16, into a fluid chamber 96 between the body 14 and the top of the collet operator 16. This fluid pressure, therefore, is exerted on the top of the collet operator 16 forcing it downwardly in engagement with the split collet 40, thereby forcing the latter to more securely grip the tube 80.

This construction of the fitting 10 also provides a safety feature, in that the fitting 10 will not automatically be disengaged with a tube 80 should the handle 26 accidentally be operated to its inoperative position during the course of testing a tube. With the fitting 10, should this happen, the shaft 20 is retracted as before described, but in this case, the collet operator 16 is forcibly urged into engagement with the collet 40 so that the latter still will grip the tube 80. What effectively happens is that the body 14 and the collet operator 16 separate enlarging the size of the air chamber 96, but the fluid pressure still is exerted on the top of the collet operator 16 forcing it to cam the collet 40 to grip the tube 80. Accordingly, the fitting will grip the tube 80 in generally the same fashion as it does when the handle 26 is first operated, until the fluid pressure is released.

It will thus be seen that the objects set forth above, among those made apparent from the preceding description, are efficiently attained and certain changes may be made in carrying out the above construction. Accordingly it is intended that all matter contained in the above description or shown in the accompanying drawings, shall be interpreted as illustrative and not in a limiting sense.

Now that the invention has been described, what is claimed as new and desired to be secured by Letters Patent is:

1. A fitting for mounting to the end of a smooth wall tube to seal the inside diameter thereof, said fitting comprising a body having a passageway extending longitudinally through it; a collet operator at one end of said body having an aperture in it in axial alignment with said passageway in said body and a cam surface on an outer surface thereof; a shaft slidably disposed within and extending through said passageway in said body and said aperture in said collet operator; means coupled to one end of said shaft and operable to slidably reciprocate said shaft; an elongated tubular split collet slidably disposed about at least a portion of said collet operator and having a cam surface on an interior diameter thereof operatively engageable with said cam surface on said collet operator and an outer surface on said split collet operatively engageable with the interior surface of said tube to grip said tube without deforming it; biasing means disposed between said collet operator and said split collet for normally urging said split collet out of engagement with said collet operator; the other end of said shaft having sealing means retained thereon; said split collet and said collet operator being forcibly urged together to engage said cam surfaces to thereby cause said split collet to grip the inside diameter of a tube and said sealing means being compressed into sealing engagement with the inside diameter of the tube when said shaft is operated, said sealing means and said split collet being disposed with respect to one another so that the sealing means engage the lower end of said split collet to raise the latter to engage said cam surface on it with said cam surface on said collet operator.

2. The fitting of claim 1, wherein the lower peripheral portion of the outer surface of said collet operator is conical-shaped so as to form said cam surface on it, said split collet having a reduced diameter portion at the lower end of it, an interior diameter of said reduced diameter portion being conical-shaped so as to form a cam surface complimentary with said cam surface on said collet operator.

3. The fitting of claim 1, wherein said sealing means comprises a substantially cylindrical-shaped resilient member disposed about said shaft, said resilient member being sandwiched between a pair of washer-like seal stops disposed about said shaft, said pair of seal stops compressing said resilient member into sealing engagement with the inside of a tube when said shaft is reciprocally operated.

4. The fitting of claim 1, wherein said body has an opening therein for receiving external means which provide a flow to said fitting; a fluid chamber between said body and the top of said collet operator; said shaft having an axial bore in it in communication with said opening in said body and said fluid chamber; fluid flow from an external source coupled to said opening in said body and from said fitting flowing into said fluid chamber and exerting a fluid pressure on said collet operator to forcibly urge said collet operator in engagement with said split collet to thereby provide a more secure grip on said tube.

5. The fitting of claim 1, wherein said means for reciprocating said shaft comprises a handle.

6. The fitting of claim 5, wherein fluid pressure is exerted upon said collet operator to forcibly urge said collet operator in engagement with said split collet to cause the latter to grip said tube once fluid pressure is coupled from an external source to said fitting regardless of the operative position of said handle, whereby a safety factor is provided preventing the accidental disengagement of said fitting from a tube should the handle be accidentally or inadvertently operated to its inoperative position when the fitting is affixed to a tube and under test.

7. The fitting of claim 5, further comprising adjusting means coupled with said body and disposed between said body and said handle, said adjusting means permitting the sealing and gripping forces exerted on a tube to be adjusted by controlling the sliding reciprocating motion of said shaft.

8. The fitting of claim 7, wherein said adjusting means comprises a nut threadedly affixed to said body.

* * * * *